United States Patent [19]

Clayton, Jr.

[11] 4,437,084
[45] Mar. 13, 1984

[54] ENCAPSULATED, WATERPROOF TEMPERATURE SENSITIVE DEVICE AND METHOD OF MANUFACTURE

[75] Inventor: Harold K. Clayton, Jr., Glen Ellyn, Ill.

[73] Assignee: Cooper Industries, Inc., Houston, Tex.

[21] Appl. No.: 310,057

[22] Filed: Oct. 9, 1981

[51] Int. Cl.³ .............................................. H01C 7/13
[52] U.S. Cl. .................................. 338/22 R; 338/25; 338/28
[58] Field of Search .................. 338/22 R, 22 SD, 25, 338/28; 26/610 R, 612, 613; 374/165, 185, 194, 208

[56] References Cited

U.S. PATENT DOCUMENTS

| | | | |
|---|---|---|---|
| 3,402,378 | 9/1968 | Catlin et al. | 338/28 |
| 3,441,893 | 4/1969 | Gordon et al. | 338/26 |
| 3,537,053 | 10/1970 | Snoberger et al. | 338/25 |
| 3,681,993 | 8/1972 | Campton et al. | 73/363 AR |
| 4,079,350 | 3/1978 | Sentenments et al. | 338/22 R |
| 4,166,389 | 9/1979 | Montren | 73/343 R |
| 4,204,186 | 5/1980 | Parisi et al. | 338/30 |
| 4,246,786 | 1/1981 | Weimer et al. | 73/362 |
| 4,246,787 | 1/1981 | Harper | 338/22 R |

*Primary Examiner*—C. L. Albritton
*Attorney, Agent, or Firm*—Fitch, Even, Tabin & Flannery

[57] ABSTRACT

An encapsulated, waterproof temperature sensor, such as a thermistor, and a method of manufacturing the same are presented. The sensor is assembled with a sensor cord. The cord includes a cable with an insulating jacket and at least two conductors each with an insulating sheath. Leads of a temperature sensor, such as a thermistor, are connected to ends of the respective conductors. Heat-shrink plastic surrounds one lead and the associated conductor end. Tubing of insulating material surround the temperature sensor, its leads, the conductor ends, and the heat-shrink plastic. A shroud is molded over the tubing and a portion of the cable jacket so that the temperature sensor is encapsulated and waterproof. Four coplanar pins may be used with the shroud mold to ensure that the temperature sensor is appropriately centered in the shroud.

6 Claims, 6 Drawing Figures

ENCAPSULATED, WATERPROOF TEMPERATURE SENSITIVE DEVICE AND METHOD OF MANUFACTURE

BACKGROUND OF THE INVENTION

The present invention relates to an encapsulated, waterproof temperature sensor, and in particular to a thermistor for use with water beds.

Water beds have become increasingly popular in recent years. It is usually desirable for the water within the bed to be heated so that body heat from the user is not lost to the water and so that the bed does not feel cold. Water bed heaters are now commonly employed. Thermistors have been used to monitor water bed temperature. A thermistor is a resistor, the resistance of which is predictably varied according to temperature. Resulting variations in electric current through the thermistor can be analyzed by known means to determine the temperature of a particular environment, such as a water bed. The information provided by the thermistor may be conveyed to a control device to regulate the water bed heater and thus the bed temperature so as to maintain the latter at an optimal level.

Normally, thermistors do not contact the water in the water bed. It is common to extend a cord through a water bed frame to a thermistor disposed against the base of the water sack. Accordingly, under normal conditions, it has not been necessary to provide submersion safe thermistors or thermistor cords.

However, safety considerations dictate that a user be protected from electrical hazards in the event of a leak in the water bed. Accordingly, certifying agencies such as Underwriters' Laboratories, Inc. and the Canadian Standards Association have developed safety standards for thermistors that are used with water beds. The standards require that the water in which a thermistor is immersed remain effectively electrically insulated when 3000 volts is applied between the cable conductors and the water, which is grounded.

Accordingly, it is an object of the present invention to provide an improved temperature sensitive device, such as an encapsulated, waterproof thermistor, which can surpass the above standard. Of course, the thermistor should perform its usual function in an exemplary fashion. A further object of this invention is to provide an economical and reliable method of manufacturing such device.

SUMMARY OF THE INVENTION

In accordance with the present invention, a temperature sensitive device, such as a thermistor, is provided which surpasses the 3000 volt water test and is reliably and economically manufactured in accordance with the present invention.

The device of the present invention includes a cable and a thermistor, or temperature sensor, with a pair of leads electrically connected to respective conductors of the cable. One thermistor lead and the associated cable conductor are insulated from the other lead and conductor. Insulating tubing is slipped over the conductor ends and the thermistor and is disposed against the end of the outer jacket of the cable. A molded shroud encapsulates the insulating tubing along with its contents and an end segment of the cable jacket.

The device may be manufactured from the cable, which has its conductors and their insulating sheaths appropriately exposed, as follows. A thermistor with two leads is attached to the cable so that each lead is electrically connected to a tip of a respective conductor. Insulating material is applied about one of the thermistor leads and the associated cable conductor so as to insulate them from the other lead and cable. An insulating tubing, preferably with an outer diameter close to that of the cable jacket, is applied over the above assembly; an end of the tubing is disposed against the thermistor end of the cable jacket. A substantially solid shroud is molded about said tubing and an end portion of the cable jacket.

It is preferable to center the insulating tubing within the mold by means of pins extending from the mold to the outer surface of the insulating tubing. The pins contact the tubing away from its ends.

It is essential that the shroud encapsulate the thermistor and provide a waterproof barrier to exclude water from the thermistor and the respective leads and conductors. The shroud must therefore be effectively bonded to the cable jacket and the insulating tubing in such manner as to provide a continuous effective water barrier. The bonding must therefore circumscribe the jacket and the holes made by the pins. A preferable manner of assuring adequate bonding is to make all of the bonded elements of the same material, such as polyvinyl chloride (PVC). Thus, the jacket, the insulating tubing and the shroud are all preferably made of PVC. Bonding of the shroud may be enhanced by brushing cyclahexanone on the surface of the insulating tubing and on the surface of the end portion of the cable jacket prior to molding.

In accordance with the foregoing, the inventive thermistor device may be economically and reliably manufactured. The resulting thermistor device is capable of surpassing the 3000 volt water test as well as performing as required under normal use as a component in a water bed temperature regulating system. The invention is also applicable to other situations in which temperature monitoring and/or control are desired.

DESCRIPTION OF PREFERRED EMBODIMENTS

Figure 1:
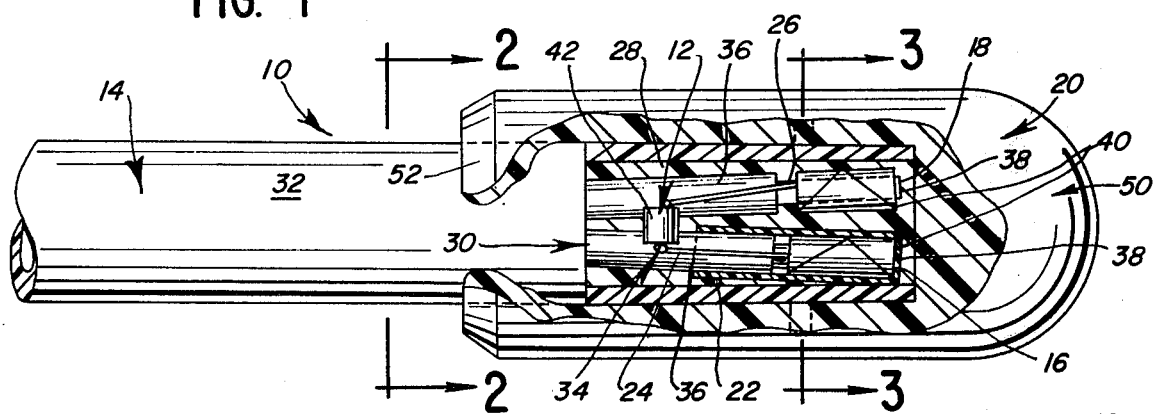
FIG. 1 is a side elevational view of an end of a thermistor cord with thermistor encapsulated in accordance with the present invention, with a portion broken away and certain parts shown in vertical and axial section.
Figure 2:
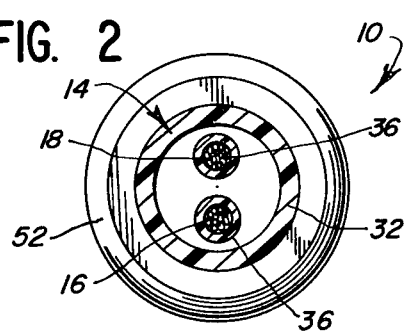
FIG. 2 is a sectional view of the device shown in FIG. 1 taken along line 2—2 of FIG. 1.
Figure 3:
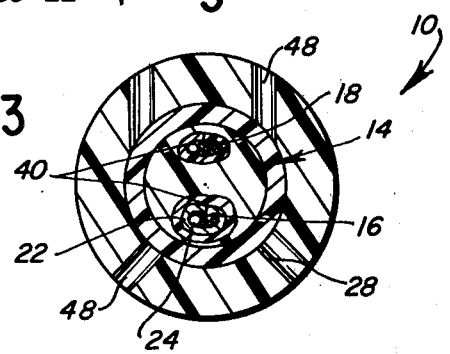
FIG. 3 is a sectional view of the device shown in FIG. 1 taken along line 3—3 of FIG. 1.

A temperature sensitive device 10 with a temperature sensor 12, such as a thermistor, and a method of manufacturing the same are presented. The temperature sensitive device 10 includes a cable 14, the thermistor 12 electrically connected to conductors 16 and 18 of the cable 14, and a protective shroud 20. The temperature sensitive device 10 is applicable to temperature regulation of water beds. Industry standards require that such a cord pass a 3000 volt water test. This test requires that water into which the cord is submersed be effectively electrically insulated from the device when 3000 volts is applied across the thermistor.

In accordance with the present invention, protection against shorting is preferably provided in part by heat-shrink material 22 disposed over one thermistor lead 24 and the attached conductor 16 so as to insulate them from the other lead 26 and conductor 18. Insulating tubing 28 is disposed against the thermistor end 30 of a jacket 32 of the cable 14 and extends over the thermistor assembly 34 comprising ends of the conductors 16 and 18, the thermistor 12 and the heat-shrink material 22. The molded shroud 20 encapsulates the insulating tubing 28 along with its contents and an end segment of the cable jacket 32.

The thermistor device 10 may be manufactured as follows. The cable 14, which comprises two conductors 16 and 18 with insulating sheaths 36 and a cable jacket 32, is prepared in a manner well known in the art: the jacket 32 is removed from an end portion of predetermined extent to expose the two insulating sheaths 36, and lesser lengths of the sheaths 36 are removed to expose the ends 38 of the cable conductors 16 and 18. The leads 24 and 26 of the thermistor 12 are then attached to respective conductors 16 and 18. Such attachment may be effected by disposing the end of each lead 24, 26 against the end of its respective conductor 16, 18 and crimping metal barrels 40 over each assembly. Preferably, the thermistor body 42 is positioned between the barrels 40 and the cable jacket 32 to provide a more compact end product.

Heat-shrink material 22, preferably PVC tubing, is then placed over one thermistor lead 24 and the attached conductor 16 to insulate them from the other lead 26 and conductor 18. The heat-shrink material extends over the respective crimped metal barrel 40 to adjacent the thermistor body 42.

The insulating tubing 28 is then positioned over the exposed thermistor assembly 34 and adjacent the thermistor end 30 of the cable jacket 32. This insulating tubing 28 provides protection and integrity to the thermistor assembly 34. Preferably, the insulating tubing 28 has an outer diameter approximately equal to that of the cable jacket 32 so that a relatively continuous surface is provided in preparation for molding the shroud 20.

Since the bonding between the shroud 20 and the insulating tubing 28 and the jacket 32 is crucial to the desired waterproofing, it is preferable to prepare the surfaces of the insulating tubing 28 and the jacket 32 with a bonding agent. Accordingly, cyclahexanone may be brushed upon these surfaces prior to molding.

It is also important that the thermistor assembly 34 be well centered within the shroud 20. This centering ensures that the response of the thermistor 12 is not so dependent on the orientation of the cord 10 with respect to the water bed or other heat source. Furthermore, internal stresses in the assembly are minimized if the equilibrium centered position is maintained. Accordingly, pins 44 and 46 extending from a mold to the insulating tubing 28 are used to maintain centering during the molding process.

Figure 4:
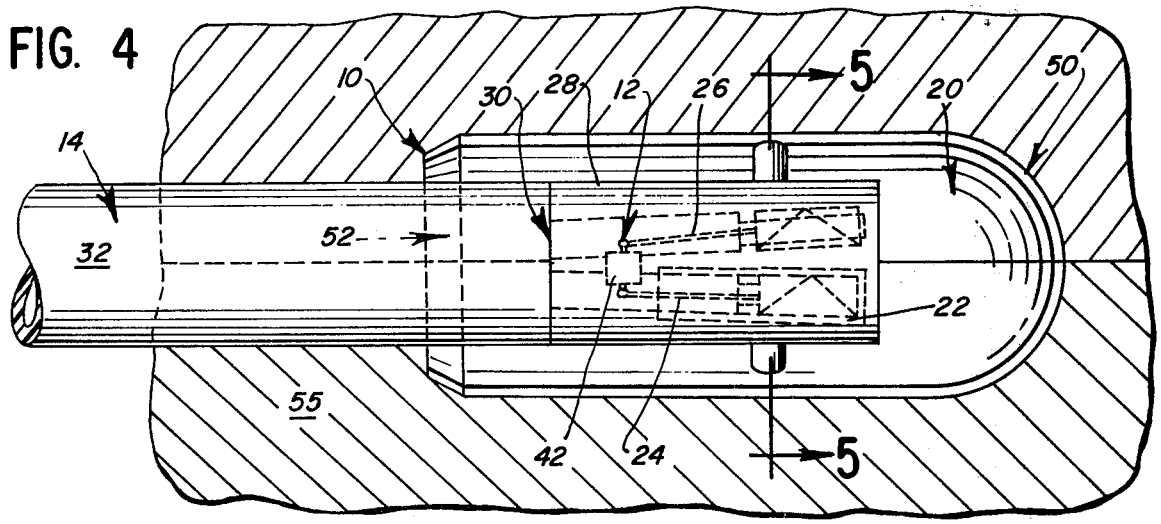
FIG. 4 is a side elevational view of the device shown in FIG. 1 as disposed within a mold shown in vertical section before a shroud is molded about the thermistor.
Figure 5:
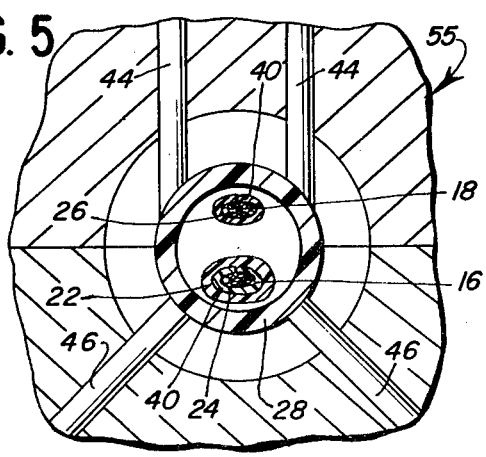
FIG. 5 is a sectional view of the device in the mold as shown in FIG. 4 taken along line 5—5 of FIG. 4.

In the preferred method, four pins 44 and 46 are applied to the insulating tubing surface, as shown in FIGS. 4 and 5. Two upper pins 44 extend vertically to the upper lateral extremities of the surface of the insulating tubing 28, and two radial pins 46 extend 45° diagonally upward and radially to the same surface. The illustrated pins 44 and 46 are coplanar and are spaced away from either end of the insulating tubing 28. Thus, any water entering the holes 48 left by the pins 44 and 46 after manufacture is prevented from reaching the thermistor assembly 34 by bonding existing around the holes 48 and between such holes and both ends of the insulating tubing 28.

Figure 6:
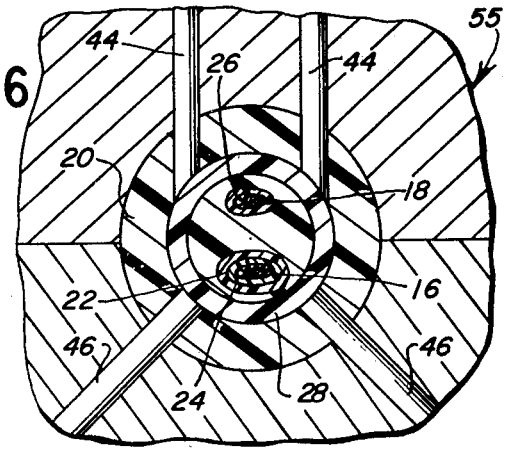
FIG. 6 is a view similar to FIG. 5 taken after the injection of molding material into the mold.

The shroud 20 is preferably plastic injection molded in a mold 55. The pins 44 and 46 maintain the insulating tubing 28 and the thermistor assembly centered within the 55 mold during injection and curing, as shown in FIG. 6. The shroud 20 is formed over the entire insulating tubing and thermistor assembly 34 as well as an end portion of the cable jacket 32 to cover all entrances to the thermistor assembly 34. The molding material infuses into the crevice between the jacket 32 and the insulating tubing 28, through the front of the insulating tubing 28, and about the thermistor assembly 34 so as to further ensure against electrical shorting and moisture seepage.

The illustrated shape of the shroud 20 is basically cylindrical with a hemispherical end 50 away from the cable jacket 32 and a beveled end 52 extending over the cable jacket 32. The beveling renders it more difficult for the shroud 20 to catch on objects so that unnecessary stresses on the cable 14 may be avoided.

The preferred thermistor device 10 utilizes PVC for the cable jacket 32, the insulating tubing 28 and the shroud 20. The similarity of materials provides for more assured fusing and bonding during the molding operation. In an alternative embodiment, the insulating tubing 28 may be a heat-shrink PVC.

The following dimensions are appropriate to a thermistor device utilizing SJT cable rated at 300 volts and 60° C. The jacket 32 is of water resistant plastic or PVC and is 0.030" thick. The conductors 16 and 18 are stranded 18 AWG copper wires. The insulating tubing 28 should have an outside diameter comparable to that of the cable jacket 32.

The tubing 28 is made of insulating material, preferably PVC, and of thickness sufficient to meet the 3000 volt water test as the barrels 40 may abut the tubing 28 opposite a hole 48, in which case the entire applied test voltage would be across the tubing. The insulating sheaths 36 over the conductors may be of 1/32" PVC. The shroud 20 may be of PVC 1.25" long and may have an outer diameter of 7/16". The bevel may be 30° from the horizontal and extend to a lesser diameter of ⅛". The pins 44 and 46 and associated holes 48 are located 9/16" from the front of the shroud 20, a little front of center.

In accordance with the above, a thermistor device 10 is presented which functions in an exemplary fashion under normal conditions and meets safety standards, such as the 3000 volt water test. An economical and reliable method of manufacturing such a cord is also presented.

Clearly, the invention provides for other dimensions and materials. Also, the invention is applicable to cords with other resistive elements and to the measurement and regulation of temperature in contexts other than water beds. The above and other embodiments are within the spirit and scope of the present invention.

What is claimed is:

1. An encapsulated, waterproof temperature sensitive device comprising:
an elongated cable including two conductors, and a cable jacket surrounding said conductors, the proximal ends of said conductors extending proximally beyond the proximal end of said cable jacket;

a temperature sensor with two leads, each lead being connected to the proximal end of a respective one of said conductors, said temperature sensor having an electrical property systematically related to the temperature of said sensor, whereby an electrical signal indicative of temperature may be sensed at the distal ends of said conductors;

means for electrically insulating one of said leads and respective conductor from the other of said leads and respective conductor;

tubing of insulating material extending from adjacent said jacket and surrounding said temperature sensor, said leads and the proximal ends of said conductors;

a substantially solid, molded shroud encapsulating said tubing, said temperature sensor, said leads, the proximal ends of said conductors, and the proximal end of said jacket, said shroud having at least one passageway extending from its exterior to said tubing between the ends of said tubing, said shroud being sealed to said jacket around its entire circumference and sealed to said tubing around all said passageways so as to waterproof said device.

2. The cord of claim 1 further characterized in that the outer diameter of said jacket of said cable is approximately equal to the outer diameter of said tubing.

3. The device of claim 1 or 2 further characterized in that said means for electrically insulating is made of heat-shrink plastic.

4. The device of claim 1, 2 or 3 further characterized in that said jacket, said tubing and said shroud are of polyvinyl chloride.

5. The device of claim 1, 2, 3 or 4 further characterized in that said temperature sensor is a thermistor.

6. A temperature sensitive device according to claim 1, 2, 3, or 4 wherein said tubing withstands at least 3000 volts.

* * * * *